(12) United States Patent
Jiang et al.

(10) Patent No.: US 11,263,539 B2
(45) Date of Patent: Mar. 1, 2022

(54) DISTRIBUTED MACHINE LEARNING METHOD AND SYSTEM

(71) Applicant: Tencent Technology (Shenzhen) Company Limited, Shenzhen (CN)

(72) Inventors: Jiawei Jiang, Shenzhen (CN); Bin Cui, Shenzhen (CN); Ming Huang, Shenzhen (CN); Pin Xiao, Shenzhen (CN); Benlong Hu, Shenzhen (CN); Lele Yu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 561 days.

(21) Appl. No.: 16/266,559

(22) Filed: Feb. 4, 2019

(65) Prior Publication Data

US 2019/0171952 A1    Jun. 6, 2019

Related U.S. Application Data

(63) Continuation of application No. PCT/CN2017/108036, filed on Oct. 27, 2017.

(30) Foreign Application Priority Data

Oct. 31, 2016  (CN) .......................... 201610968121.4

(51) Int. Cl.
*G06N 5/04* (2006.01)
*G06N 20/00* (2019.01)
*G06F 9/52* (2006.01)

(52) U.S. Cl.
CPC ............... *G06N 5/043* (2013.01); *G06F 9/52* (2013.01); *G06N 20/00* (2019.01)

(58) Field of Classification Search
None
See application file for complete search history.

(56) References Cited

U.S. PATENT DOCUMENTS

2013/0290223 A1    10/2013 Chapelle et al.

FOREIGN PATENT DOCUMENTS

| CN | 103745225 A | 4/2014 |
| CN | 104714852 A | 6/2015 |
| CN | 106059972 A | 10/2016 |

OTHER PUBLICATIONS

Xing, Eric P., et al. "Petuum: A new platform for distributed machine learning on big data." IEEE transactions on Big Data 1.2 (2015): 49-67. (Year: 2015).*

(Continued)

*Primary Examiner* — Vincent Gonzales
(74) *Attorney, Agent, or Firm* — Crowell & Moring LLP

(57) ABSTRACT

A method and system for distributed machine learning and model training are disclosed. In particular, a finite asynchronous parallel training scheme is described. The finite asynchronous parallel training takes advantage of the benefits of both asynchronous parallel training and synchronous parallel training. The computation delays in various distributed computation nodes are further considered when training parameter are updated during each round of iterative training. The disclosed method and system facilities increase of model training speed and efficiency.

14 Claims, 7 Drawing Sheets

(56) References Cited

OTHER PUBLICATIONS

Peteiro-Barral, Diego, and Bertha Guijarro-Berdiñas. "A survey of methods for distributed machine learning." Progress in Artificial Intelligence 2.1 (2013): 1-11. (Year: 2013).*

Dai, Wei, et al. "High-performance distributed ML at scale through parameter server consistency models." Proceedings of the AAAI Conference on Artificial Intelligence. vol. 29. No. 1. 2015. pp. 79-87. (Year: 2015).*

Ho, Qirong, et al. "More effective distributed ml via a stale synchronous parallel parameter server." Advances in neural information processing systems. 2013. 9 pages. (Year: 2013).*

Search Report received for PCT Application No. PCT/CN2017/108036 dated Jan. 29, 2018 (Chinese language only) (12 pp.)

* cited by examiner

DISTRIBUTED MACHINE LEARNING METHOD AND SYSTEM

RELATED APPLICATION

This application claims priority to International PCT Application No. PCT/CN2017/108036, entitled "DISTRIBUTED MACHINE LEARNING METHOD AND SYSTEM" filed with the Chinese Patent Office on Oct. 27, 2017, which claims priority to Chinese Patent Application No. 201610968121.4 entitled "DISTRIBUTED MACHINE LEARNING METHOD AND SYSTEM" filed with the Chinese Patent Office on Oct. 31, 2016, which are incorporated herein by reference in their entireties.

FIELD OF THE TECHNOLOGY

This disclosure relates to the technical field of distributed computation, machine learning, and artificial intelligence, and particularly, to a finite asynchronous model parameter optimization method and system suitable for distributed machine learning.

BACKGROUND OF THE DISCLOSURE

With arrival of Big Data, a machine learning algorithm, especially a deep learning algorithm applicable for large scale data, is widely used various types of data processing and analytics systems, including but not limited to image recognition systems, recommendation engines, and user behavior prediction engines. However, with an increase of the amount of input training data (e.g., data for training a multilayer convolutional neural network model) and complexity of these models, single-node machine learning and training may be hindered by memory and computing power limitations, requiring excessively amount of training time for obtaining a model. As such, distributed machine learning may be advantageous.

Existing distributed machine learning includes, e.g., distributed machine learning based on a synchronous parallel protocol and distributed machine learning based on an asynchronous parallel protocol. A typical distributed machine learning system may include a parameter server and computation nodes. In distributed machine learning based on the synchronous parallel protocol, all the computation nodes may update a parameter and send the parameter to the parameter server after completing a current round of multiple rounds of iterative training, and the parameter server may acquire and generate a new global parameter according to the parameter updates from all the computation nodes during the current round and broadcast the new global parameter to all the computation nodes for a next round of training. This implementation is synchronous because each computation node starts a next iteration round only after receiving the new global parameters. In distributed machine learning based on the asynchronous parallel protocol, each computation node sends an updated parameter to the parameter server after finishing one iteration round in a distributed machine learning training task. The parameter server acquires new global parameters independently based on updated parameters from each computation node. A computation node receives updated global parameters directly from the parameter server, and start a next iteration round without waiting for other computation nodes to update.

However, the foregoing distributed machine learning has the following defects.

The parameter server in the distributed machine learning based on the synchronous parallel protocol can only be a physical server and will become a single-point bottleneck when a model parameter set is large in size. In a distributed environment in an industrial setting, for example, due to performance difference and network delay of computation nodes, computation and training progression speed of some computation nodes may be lower than other computation nodes. As such, the speed of the whole system may be limited by the lowest computation node when operated in the synchronous mode. In distributed machine learning based on the asynchronous parallel protocol, computation nodes are allowed to have different progression speeds, and as a result, a global parameter of a parameter server may be inconsistent with corresponding copies of the parameter in all the computation nodes. Parameter updates computed by different computation nodes by using inconsistent parameter copies may disturb the global parameter, resulting in instable convergence of a learning model.

SUMMARY

This disclosure provides a distributed machine learning method and a distributed machine learning system without a single-point bottleneck and with stable convergence.

A distributed machine learning method is disclosed. The method includes:

receiving, by a parameter server, a global parameter acquisition instruction of a current computation node;

determining, by the parameter server, whether a difference between a current sequence number of iteration rounds of the current computation node and a current sequence number of iteration rounds of another computation node falls within a preset range of number of rounds;

sending, by the parameter server, a global parameter to the current computation node if the difference between the current sequence number of iteration rounds of the current computation node and the current sequence number of iteration rounds of another computation node falls within the preset range of number of rounds; and receiving, by the parameter server, an updated parameter sent by the current computation node after performing current iteration round of iterative learning according to the global parameter, computing a delay parameter according to a timestamp of receiving the updated parameter and a determined timestamp of receiving the global parameter by the current computation node, updating the global parameter according to the delay parameter and the updated parameter to acquire an updated global parameter, and storing the updated global parameter.

A distributed machine learning system is disclosed. The system includes a processor and a memory connected to the processor, the memory stores an instruction unit that is performed by the processor, and the instruction unit includes:

an instruction receiving module, configured to receive a global parameter acquisition instruction of a current computation node;

a determining module, configured to determine whether a difference between a current sequence number of iteration rounds of the current computation node and a current sequence number of iteration rounds of another computation node falls within a preset range of number of rounds;

a global parameter sending module, configured to send a global parameter to the current computation node when the difference between the current sequence number of iteration rounds of the current computation node and the current sequence number of iteration rounds of another computation node falls within the preset range of number of rounds; and an updating module, configured to receive an updated parameter sent by the current computation node after performing current iteration round of iterative learning according to the global parameter, compute a delay parameter according to a timestamp of receiving the updated parameter and a timestamp of receiving the global parameter by the current computation node, update the global parameter according to the delay parameter and the updated parameter to acquire an updated global parameter, and store the updated global parameter.

A distributed machine learning method is further disclosed. The method includes:

sending, by a computation node, a global parameter acquisition instruction to a parameter server;

receiving, by the computation node, a global parameter sent by the parameter server according to a determining result of determining whether a difference between a current sequence number of iteration rounds of the computation node and a current sequence number of iteration rounds of another computation node falls within a preset range of number of rounds;

performing, by the computation node, current iteration round of iterative learning according to the global parameter and acquiring an updated parameter; and sending, by the computation node, the updated parameter to the parameter server.

A distributed machine learning system is further disclosed. The system includes a processor and a memory connected to the processor, the memory stores an instruction unit that is performed by the processor, and the instruction unit includes:

an instruction sending module, configured to send a global parameter acquisition instruction to a parameter server;

a global parameter receiving module, configured to receive a global parameter sent by the parameter server according to a determining result of determining whether a difference between a current sequence number of iteration rounds of the current computation node and a current quantity of iteration rounds of another computation node falls within a preset range of number of rounds;

a learning module, configured to perform current iteration round of iterative learning according to the global parameter and acquire an updated parameter; and an updated parameter sending module, configured to send the updated parameter to the parameter server.

A non-transitory storage medium for storing a computer program is disclosed. The computer program may be executed by a processor to implement the distributed machine learning method according to any of the foregoing embodiments.

For the distributed machine learning method and the distributed machine learning system, each computation node uses an allocated data subset to perform a parallel stochastic gradient descent (SGD) algorithm to learn a training machine learning model iteratively, and uses a parallel acceleration algorithm model for training, thereby avoiding a single-point bottleneck, and ensuring processing of TB or higher level of data quantity. A computation node acquires a latest global parameter from a parameter server before starting each iteration round, receives a global parameter sent by the parameter server only after determining an iteration progression speed of the current computation node falls within a preset range of number of rounds, and then starts the current round of iterative learning, thereby limiting a speed difference between different computation nodes within a preset range of number of rounds, forming distributed machine learning of a finite asynchronous parallel protocol, reducing disturbance influence of updates generated by different computation nodes on the global parameter, and ensuring stable convergence.

DESCRIPTION OF EMBODIMENTS

In order to clearly convey the objectives, technical solutions, and advantages of the embodiments of this disclosure, this application will be further described with reference to the accompany drawings and embodiments. It should be understood that, the specific embodiments described herein are merely exemplary and illustrative, rather than limiting.

Unless otherwise defined, all scientific and technical terms used herein have the same meanings as those usually understood by a person having ordinary skill in the art. The terms in the specification of this disclosure are only intended to describe specific embodiments, rather than limiting this disclosure. The term "and/or" herein includes any and all combinations of one or more of associated listed items.

Figure 1:
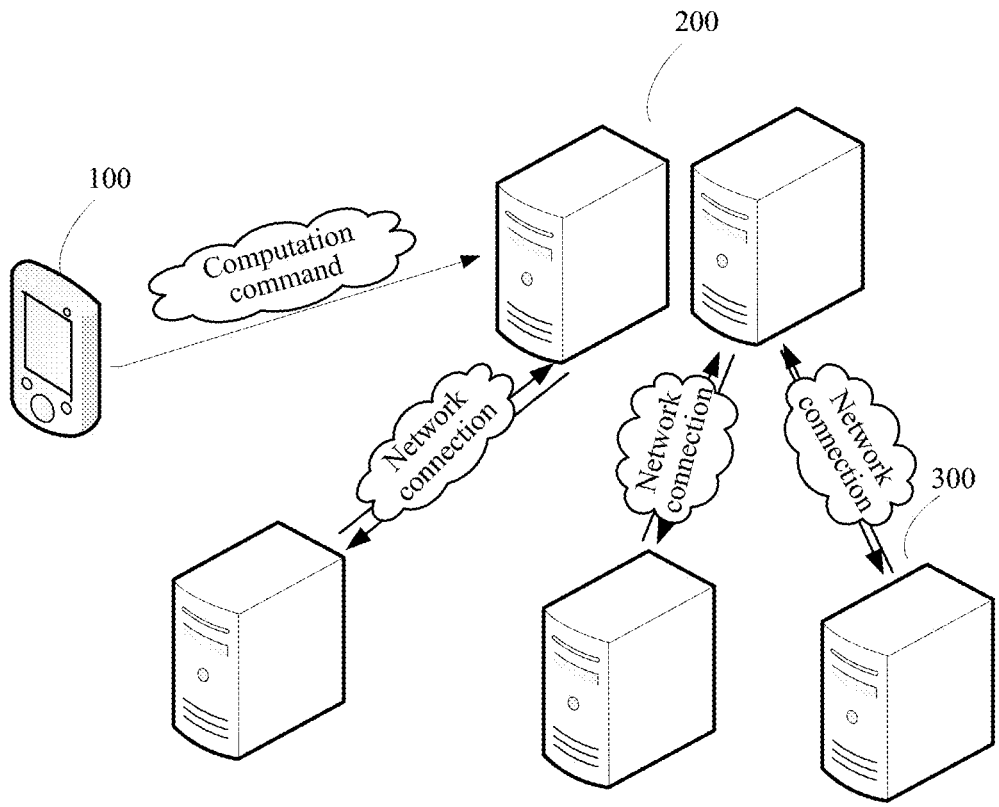
FIG. 1 is a system architectural diagram of a distributed machine learning method.

A distributed machine learning method according to an embodiment of this disclosure may be applied in a system shown in FIG. 1. As shown in FIG. 1, a master control node 100 communicates with a computation node 300 through a parameter server 200, constituting a distributed machine learning system. The master control node 100 sends a learning task instruction to the parameter server 200, and monitors the parameter server 200 and the computation node 300. The parameter server 200 receives the learning task instruction and then sends a global parameter to each computation node 300, and each computation node 300 performs iterative learning according to the global parameter and returns an updated parameter to the parameter server 200. The master control node 100 may include but is not limited to a smartphone, a tablet computer, a personal digital assistant (PDA), and a personal computer. The parameter server 200 and the computation node 300 are usually a physical server cluster.

Figure 2:
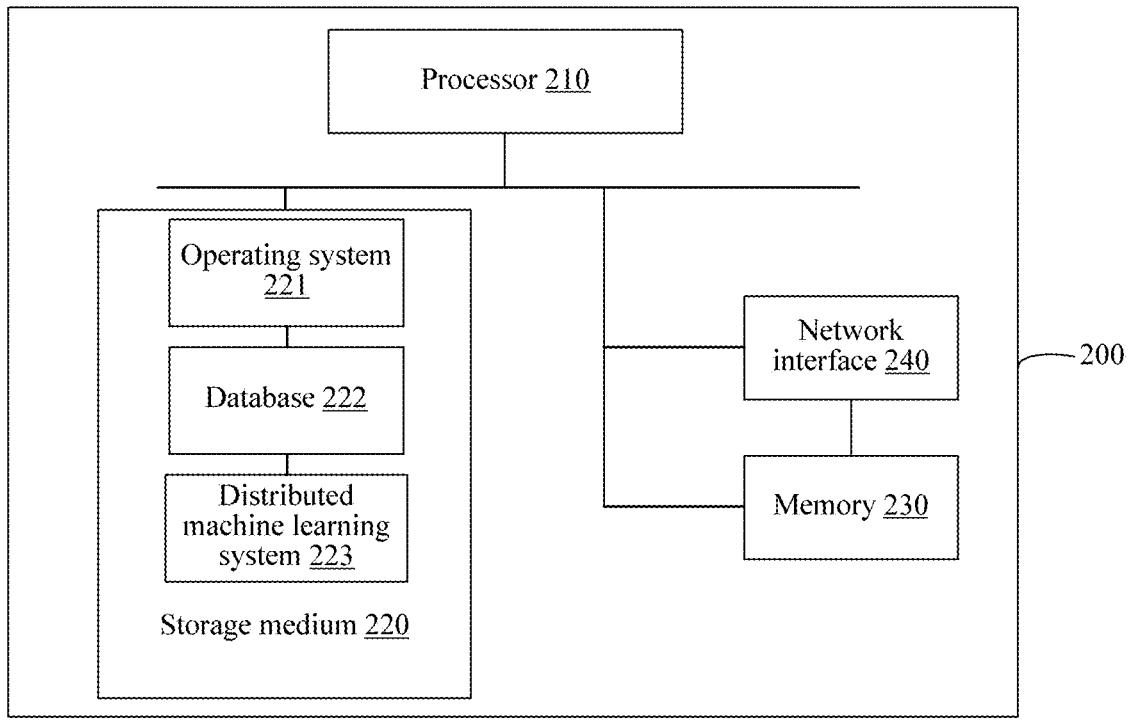
FIG. 2 is a schematic view of internal components of a parameter server.

An internal architecture of an exemplary parameter server 200 in FIG. 1 is shown in FIG. 2. The parameter server 200 may include a processor 210, a storage medium 220, a memory 230, and a network interface 240 that are connected through a system bus. The storage medium 220 of the parameter server 200 stores an operating system 221, a database 222, and a distributed machine learning system 223. The database 222 is configured to store data, such as a global parameter, a global parameter timestamp, a current sequence number of iteration rounds of a computation node, an updated parameter of a computation node, and a preset range of allowed speed differences of computation nodes. The processor 210 of the server 200 is configured to provide computation and control capability and support operation of the whole parameter server 200. The memory 230 of the parameter server 200 provides an operating storage environment for operation of the distributed machine learning system 223 in the storage medium 220. The network interface 240 of the server 200 is configured to communicate with an external master control node 100 and an external computation node 300 through a network connection for receiving a learning task instruction sent by the master control node 100, sending a global parameter to the computation node 300, and receiving an updated parameter sent by the computation node 300.

Figure 3:
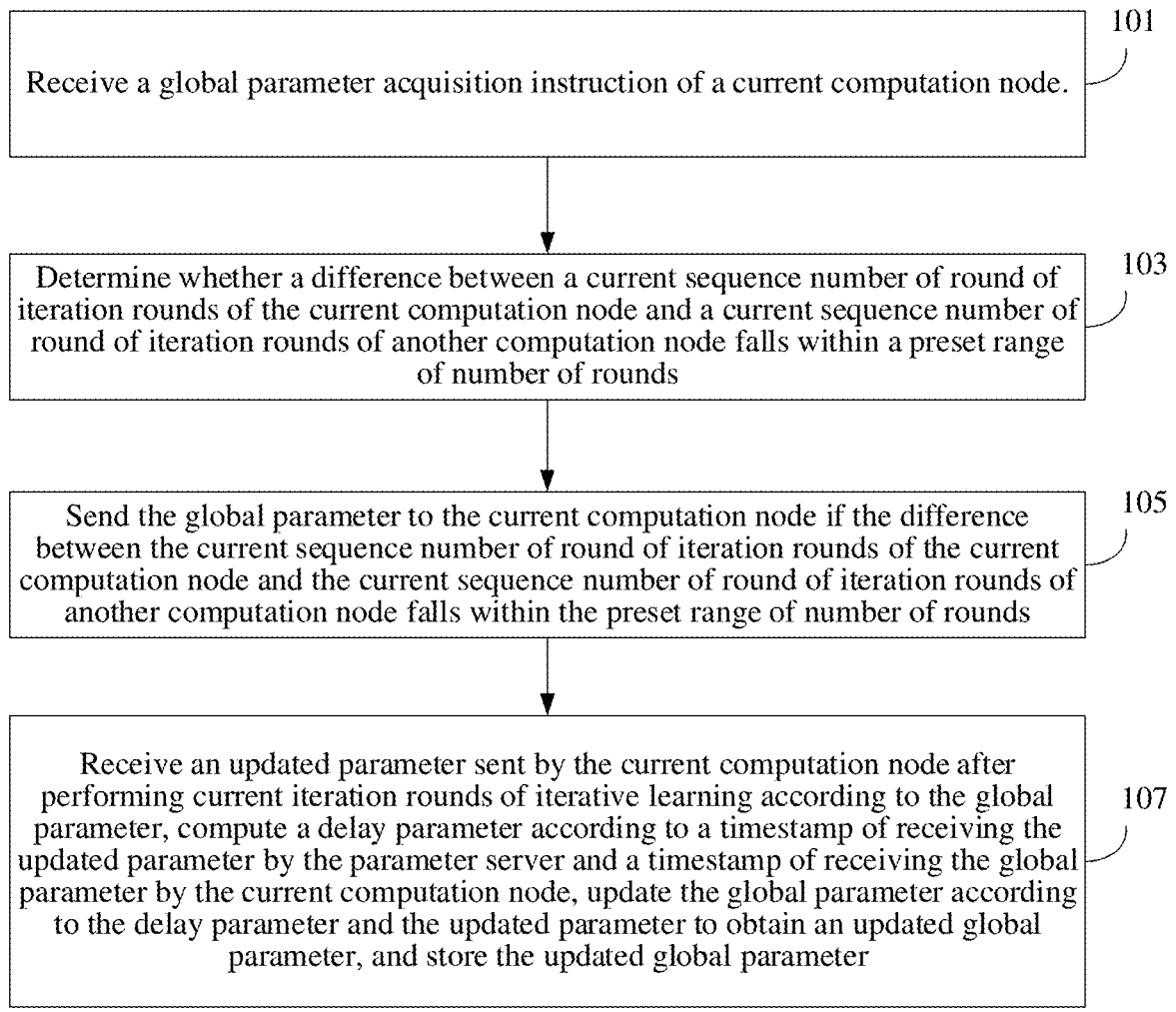
FIG. 3 is a logic flow of a distributed machine learning method.

FIG. 3 shows a distributed machine learning method according to an embodiment of this disclosure, and the method may be applied to the parameter server shown in FIG. 2 and specifically includes the following steps. The parameter server communicates with all computation nodes. For simplicity of description, the steps below sometimes refer to a particular representative computation node referred to as "current computation node" or "first computation node". The "current computation node" or the "first computation node" can be any of the computation nodes.

In Step 101, a global parameter acquisition instruction from the current computation node is received.

The distributed machine learning refers to performing a machine learning task in a distributed environment and distributing training data into multiple computation nodes, where each computation node uses an allocated training data subset to perform an parallel Stochastic Gradient Descent (SGD) algorithm to iteratively learn and train a machine learning model according to the machine learning task. An SGD algorithm is an optimization algorithm that is commonly used in iterative machine learning. There may be multiple computation nodes that may be distributed in multiple locations. Before performing a current round of multiple rounds of iterative learning, each computation node may send a global parameter acquisition instruction to the parameter server to acquire current latest global parameters needed for each node.

In Step 103, it is determined whether a difference between a sequence number of a current round of iteration rounds of the current computation node and a sequence number of a current round of iteration rounds of another computation node falls within a preset range of number of rounds, and perform step 105 if the difference falls within the preset range of number of rounds.

The preset range of number of rounds is used to limit speed or progression difference between different computation nodes to not exceeding a range corresponding to the preset range of number of rounds when performing the iterative learning, so as to avoid a situation in which the iteration progression of some computation nodes are too far ahead than others, leading to large differences and inconsistency between global parameter copies used by different computation nodes. Using global parameter copies that are too inconsistent by different computation nodes to generate updated parameters would disturb the global parameter updates by the parameter server. By using the preset range of number of rounds as a limit, the speed or progression difference of different computation nodes is correspondingly limited, forming a distributed machine learning scheme based on a finite asynchronous parallel protocol (alternatively referred to as quasi asynchronous parallel protocol), which helps reduce the effect of in consistent updates of different computation nodes on the global parameters. This may be viewed as a hybrid of a completely asynchronous parallel protocol and a completely synchronous parallel protocol.

Furthermore, when the difference between a first sequence number of a current round of iteration of the current computation node and a second sequence number of a current round of iteration of a second computation node exceeds the preset range of number of rounds, e.g., the first sequence number is larger (or smaller) than the second sequence number by more than the present range of number of rounds, it indicates that the current node is progressing too fast (or too slow) compared to the second node and should be delayed until the difference is below the preset range of number of rounds.

In Step 105, the global parameters are sent to the current computation node.

When the difference between the sequence number of the current round of iteration of the current computation node and the sequence number of the current round of iteration of another computation node falls within the preset range of number of rounds, the latest global parameters that are stored currently is sent to the current computation node. That is, when the difference between the current sequence number of the current round of iteration of the current computation node and the sequence number of the current round of iteration of another computation node falls within the preset range of number of rounds, it indicates that the current progression of the current computation node is acceptable, and the current round of iterative learning may start on the current computation node. In some implementations, a copy of global parameters in a fastest computation node among all the computation nodes may be sent to the current computation node as the latest global parameters. This is because, usually, the copy of global parameters in the fastest computation node is closest to (having a minimum difference) the global parameter in the parameter server that is updated cooperatively in real time. Therefore, the copy of global parameters in the fastest computation node may serve as the latest global parameters, so as to enhance training accuracy.

In Step 107, updated parameters sent by the current computation node after performing current iteration round using the global parameter is received by the parameter server; a delay parameter (alternatively referred to as a computation delay parameter) according to a timestamp for the receiving updated parameters and a timestamp for receiving the global parameter by the current computation node is calculated; the global parameters are updated according to the delay parameter and the updated parameters to generate updated global parameters; and the updated global parameters are stored.

Before each round of iterative learning in the current computation node, the parameter server sends current latest global parameters to the current computation node, so as to enable the current computation node to perform the current rounds of iterative learning according to the latest global parameters and update the parameters. The updated parameters by the current computation node are returned to the parameter server. After receiving the updated parameters, the parameter server updates the global parameters. A different degree of delay will be generated when the same computation node receives the global parameter in different rounds to perform iterative learning or different computation nodes receive a global parameter in the same round to perform iterative learning. A delay parameter is computed according to a timestamp of receiving the updated parameters by the parameter server and a timestamp of receiving the global parameters by the computation node. The global parameters are updated by the parameter server according to the delay parameter and the updated parameters from the computation node. The delay parameter directly reflects a computational delay in a computation node. By updating the global parameters based on both the updated parameters and the delay parameter, different amount of delay generated by each round of iterative learning of the computation node would influence updating of the global parameters to a different extent, and therefore control the disturbance of parameter updates generated by different computation nodes to the global parameter.

For the distributed machine learning method, each computation node uses an allocated training data subset to perform a parallel SGD algorithm to iteratively learn and train a machine learning model. Each computation node further uses a parallel acceleration algorithm to perform model training, greatly reducing training time (e.g., from months to a week or several days) and avoiding single-point bottlenecks, and facilitate and ensure processing of a terabyte or higher level of data volume. The difference between sequence number of rounds of iteration for different computation nodes is controlled to be within a preset range of number of rounds. A delay parameter corresponding to the computation node is further computed according to a timestamp for receiving the updated parameters by the parameter server and a timestamp for receiving the global parameters by each computation node. The global parameter is further updated according to and with restriction by both the delay parameter and the updated parameters. Consideration of the delay parameters in the update of the global parameters takes into account the effect of a different degree of delay may have in adjusting and updating the global parameters. As such, disturbance of parameter updates generated by different computation nodes on the global parameters is reduced, thereby facilitating and ensuring stability of the convergence of the model training.

In some implementations, step 103 for determining whether a difference between a current sequence number of round of iteration of the current computation node and a current sequence number of round of iteration of another computation node falls in a preset range of number of rounds) may specifically include:

determining whether a difference between the current sequence number of round of iteration of the current computation node and a current minimum sequence number of round of iteration among all computation nodes falls within a first preset range of number of rounds.

In distributed machine learning, if sequence numbers of round of iteration for different computation nodes differ too much, the parameter server and the computation nodes cannot always approximately maintain latest parameter information, resulting in loss of some updated data and a deterioration the training accuracy. Among all computation nodes, a current minimum sequence number of round of iteration represents a real-time training iteration progression of the slowest computation node. The real-time iteration round sequence number of the slowest computation node is compared to determine whether their differences fall within the first preset range of number of rounds, thereby controlling the progression of all computation nodes to be quasi synchronized and ensuring differences of iteration progression speeds of all computation nodes do not exceed the preset range of number of rounds.

In some alternative implementations, step 103 of determining whether a difference between a current sequence number of round of iteration of the current computation node and a current sequence number of round of iteration of another computation node falls in a preset range or number of rounds may specifically include:

determining whether a difference between a current sequence number of round of iteration of the current computation node and a current maximum sequence number of round of iteration among all computation nodes falls within a second preset range of number of rounds.

Among all computation nodes, a current maximum sequence number of round of iteration represents a real-time iteration status of a computation node having fastest iteration progression. The real-time iteration progression status of the fastest computation node may be compared with other nodes to determine whether the differences in iteration sequence numbers fall within the second preset range of number of rounds, thereby controlling the progression of all computation node to be quasi synchronized and ensuring that differences of iteration progression speeds of all computation nodes do not exceed the preset range.

In some implementations, step 105 of sending the global parameters to the current computation node may include:

sending the global parameters to the current computation node, acquire and store a timestamp for receiving the global parameters by the current computation node.

The timestamp for receiving the global parameter by the current computation node represents time when the computation node acquires the global parameters before performing the current round of iterative learning. Since each round of iterative learning will generate updated parameters and the global parameters will be updated, storing the timestamp for receiving the global parameter by the current computation node as a most recent timestamp for the global parameters may serve as starting time of determining a computation delay of the current round of iterative learning. After the step of computing the delay parameter according to the timestamp for receiving the updated parameters by the parameter server and the timestamp for receiving the global parameters by the current computation node, a computation delay degree for the current computation node to perform the current round of iterative learning is obtained for parameter updating to achieve a more accurate training.

In some implementations, the parameter server stores a global parameter $\theta$, and maintains a timestamp t of the global parameter. The parameter server further monitors a maximum and a minimum sequence number of round of iteration among the computation nodes, represented by Cmax and Cmin, for the fastest computation node and the slowest computation node, respectively. The parameter server may further monitor timestamps, r[ ], representing when the global parameter was most recently received by each the computation node, and initializes Cmax, Cmin, and r[ ] to be zero. The parameter server provides a Pull function interface and a Push function interface for a computation node.

For example, the mth computation node may perform the cth round of iteration. Before the cth round of iteration starts at the mth computation node, the computation node sends a global parameter acquisition instruction to the parameter server through the Pull function. The parameter server receives the global parameter acquisition instruction from the computation node m, determines whether the current sequence number of round of iteration for the mth computation node, c, falls within the preset range of number of rounds, and sends a global parameter to the mth computation node. The specific implementation method is exemplarily represented as follows:

```
function Pull(m, c):
    If c<=C_min + S:
        r[m]=t
        return θ
```

The current computation node is the mth computation node in this case, and the current sequence number of round of iteration is c. Again, Cmin refers to a current minimum sequence number of round of iteration among all computation nodes, r[ ] refers to timestamps and represent when the global parameter is received by each of the computation nodes. t refers to the recent global parameter timestamp. θ refers to the global parameter, and S refers to the preset range of number of rounds. It could be understood that, in the step of determining whether the current sequence number of round of iteration for the sequence number of round mth computation node, c, falls within the preset range of number of rounds, Cmin may be replaced with a current maximum sequence number of round of iteration Cmax among all computation nodes, and the corresponding specific implementation method is exemplarily represented as follows:

```
function Pull(m, c):
    If c<=C_max - S:
        r[m]=t
        return θ
```

The parameter server provides a Pull interface for the computation node. When starting the cth iteration round, the mth computation node acquires a new global parameter from the parameter server through the Pull interface. The parameter server compares the current sequence number c of iteration and the minimum sequence number of iteration among all computation nodes, and detects whether their difference falls within the preset range of number of rounds. Under the finite asynchronous protocol, if the difference is within the preset range the mth computation node starts the cth round of iteration. If the cth round of iteration can be started, a timestamp r[m] of the global parameter acquired by the current iteration round for the current computation node is updated as a global parameter timestamp. That is, the current global parameter timestamp serves as the timestamp r[m] representing when the global parameter is received by the current computation node for the current round of iteration. As such, the latest global parameter is provided to the current computation node.

Figure 4:
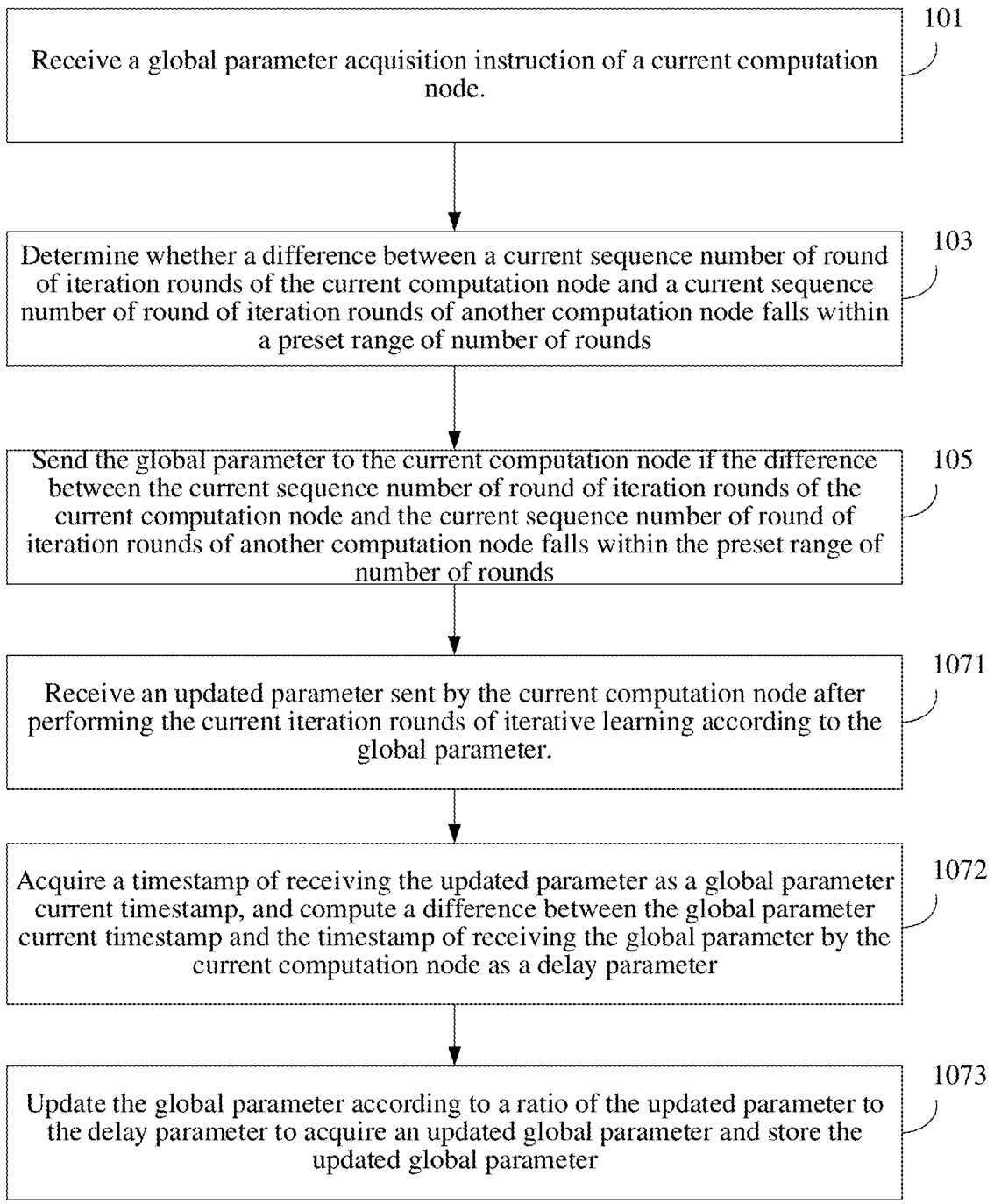
FIG. 4 is a logic flow of a distributed machine learning method.

Referring to FIG. 4, in another embodiment, step 107 for receiving the updated parameter sent by the current computation node after performing current round of iterative learning according to the global parameter, computing the delay parameter according to the timestamp for receiving the updated parameter by the parameter server and the timestamp for receiving the last global parameter by the current computation node, updating the global parameter according to the delay parameter and the updated parameter to obtain an updated global parameter, and storing the updated global parameter, may specifically include the following steps:

Step 1071: Receive an updated parameter sent by the current computation node after performing the current iteration round of iterative learning according to the global parameter.

Step 1072: Acquire a timestamp for receiving the updated parameter as a current timestamp of the global parameter, and compute a difference between the current timestamp of the global parameter and the timestamp for acquiring the global parameter by the current computation node as the delay parameter.

Step 1073: Update the global parameter according to a ratio of the updated parameter to the delay parameter to obtain an updated global parameter and store the updated global parameter.

After finishing the current round of iteration, the computation node sends the updated parameter of the global parameter to the parameter server. The parameter server takes the timestamp for receiving the updated parameter as the new timestamp for the global parameter, and computes a difference between the new timestamp for the global parameter and the timestamp for receiving the global parameter by the computation node as a delay parameter. The delay parameter corresponds to the current round of iteration of the current computation node, and reflects a computation delay of the current round of iterative learning of the current computation node. The global parameter is updated according to the ratio of the updated parameter to the delay parameter. If the delay parameter is larger, the corresponding updated parameter has less weight in updating the global parameter, and if the delay parameter is smaller, the corresponding updated parameter has more weight in updating the global parameter. In other words, the global parameter is updated using the updated parameter from the computation node with penalty determined by the delay parameter, so as to intelligently sense the delay during finite asynchronous parallel learning, and control and adjust the update on the global parameter based on computation delay. As such disturbance influence of update generated by different rounds of iterative learning at different computation nodes.

In some implementations, the parameter server takes a number of times of parameter update as a timestamp for the global parameter. Specifically, each time when an updated parameter is received, the parameter server adds 1 to the timestamp of the global parameter as the new global parameter timestamp. For example, the mth computation node starts the cth round of iteration, the computation node m sends an updated parameter to the parameter server after finishing the cth round of iteration, the parameter server acquires a timestamp for receiving the updated parameter, computes a delay parameter, and updates the global parameter according to the delay parameter and the updated parameter. The specific implementation method is exemplarily represented as follows:

```
function Push(m, c, u):
    t = t + 1:
    d = t - r[m]
    θ = θ + u/d
```

The current computation node is the computation node m, the current sequence number of iteration rounds is c. t refers to the global parameter timestamp. θ refers to the global parameter. r[ ] refers to timestamps of reading the global parameter by all computation nodes. d refers to a delay parameter. u refers to an updated parameter. The parameter server provides a Push interface for the computation node. After finishing the cth round of iteration, the mth computation node sends an updated parameter u generated in the current round of iteration to the parameter server through the Push interface. The parameter server adds 1 to the global parameter timestamp as the new timestamp for the global parameter, representing a timestamp of receiving the updated parameter, and subtracts the timestamp for acquiring the global parameter by the computation node through the Pull interface from the new timestamp of the global parameter to obtain the delay parameter d. The parameter server further divides the updated parameter u by the delay parameter d as a penalty on the updated parameter, and then adds the result to the global parameter, so as to obtain a latest global parameter. In this embodiment, the parameter server takes a number of time of parameter updates as the global parameter timestamp.

Figure 5:
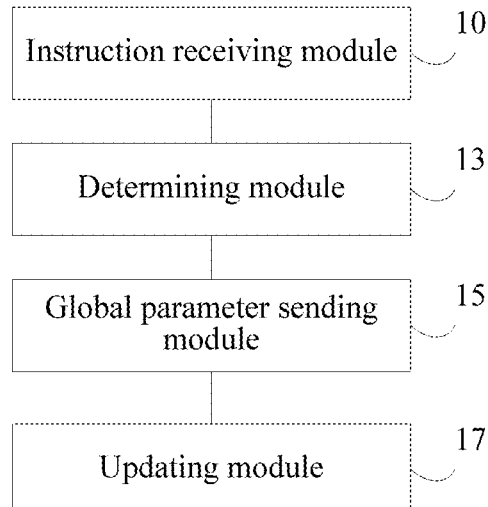
FIG. 5 is a schematic diagram of a distributed machine learning system.

As shown in FIG. 5, in an embodiment, a distributed machine learning system is provided and includes an instruction receiving module 10, a determining module 13, a global parameter sending module 15, and an updating module 17. The instruction receiving module 10 is configured to receive a global parameter acquisition instruction of a current computation node. The determining module 13 is configured to determine whether a difference between a current sequence number of iteration rounds of the current computation node and a current sequence number of iteration rounds of another computation node falls within a preset range of number of rounds. The global parameter sending module 15 is configured to send a global parameter to the current computation node when the difference between the current sequence number of iteration rounds of the current computation node and the current sequence number of iteration rounds of another computation node falls within the preset range of number of rounds. The updating module 17 is configured to receive an updated parameter sent by the current computation node after performing current iteration round of iterative learning according to the global parameter, compute a delay parameter according to a timestamp of receiving the updated parameter and a timestamp of acquiring the global parameter by the current computation node, update the global parameter according to the delay parameter and the updated parameter to acquire an updated global parameter, and store the updated global parameter.

In an embodiment, the determining module 13 is specifically configured to determine whether a difference between the current sequence number of iteration rounds of the current computation node and a current minimum sequence number of iteration rounds among all computation nodes falls within a first preset range of number of rounds. In another alternative embodiment, the determining module 13 is configured to determine whether a difference between the current sequence number of iteration rounds of the current computation node and a current maximum sequence number of iteration rounds among all computation nodes falls within a second preset range of number of rounds.

In an embodiment, the global parameter sending module 15 is specifically configured to send the global parameter to the current computation node, and acquire and store the timestamp of receiving the global parameter by the current computation node. In an embodiment, the parameter server takes the global parameter timestamp maintained by itself as the timestamp of receiving the global parameter by the computation node.

Figure 6:
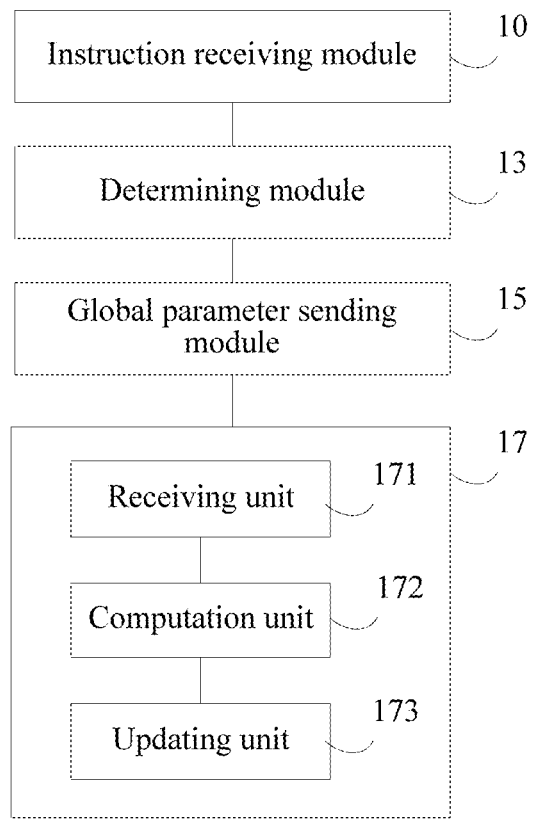
FIG. 6 is a schematic diagram of a distributed machine learning system.

In an embodiment, referring to FIG. 6, the updating module 17 specifically includes a receiving unit 171, a computation unit 172, and an updating unit 173. The receiving unit 171 is configured to receive the updated parameter sent by the current computation node after performing current iteration round of iterative learning according to the global parameter. The computation unit 172 is configured to acquire the timestamp of receiving the updated parameter as a global parameter current timestamp, and compute a difference between the global parameter current timestamp and the timestamp of receiving the global parameter by the current computation node as the delay parameter. The updating unit 173 is configured to update the global parameter according to a ratio of the updated parameter to the delay parameter to acquire the updated global parameter, and store the updated global parameter.

Figure 7:
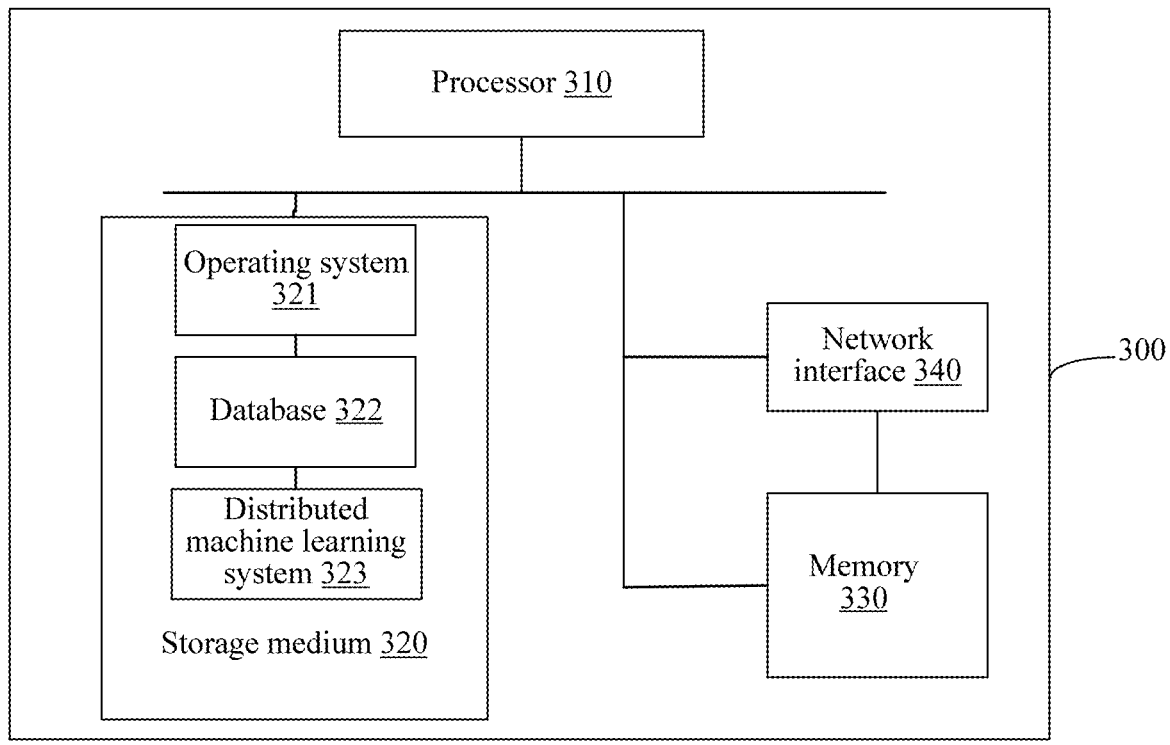
FIG. 7 is a schematic view of internal components of a computation node.

An internal components of the computation node 300 of FIG. 1 is shown in FIG. 7. The computation node 300 includes a processor 310, a storage medium 320, a memory 330, and a network interface 340 that are connected through a system bus. The storage medium 320 of the computation node 300 stores an operating system 321, a database 322, and a distributed machine learning system 323. The database 322 is configured to store local data, for example, to store a global parameter acquired from the parameter server 200 as a global parameter copy. The processor 310 of the computation node 300 is configured to provide computation and control capability, and support operation of the whole distributed machine learning system. The memory 330 of the computation node 300 provides an operation environment form the distributed machine learning system in the storage medium. The network interface 340 of the computation node 300 is configured to connect and communicate with an external parameter server 200 through a network, for example, send a global parameter acquisition instruction to the parameter server 200, receive a global parameter sent by the parameter server 200, and send an updated parameter to the parameter server 200.

Figure 8:
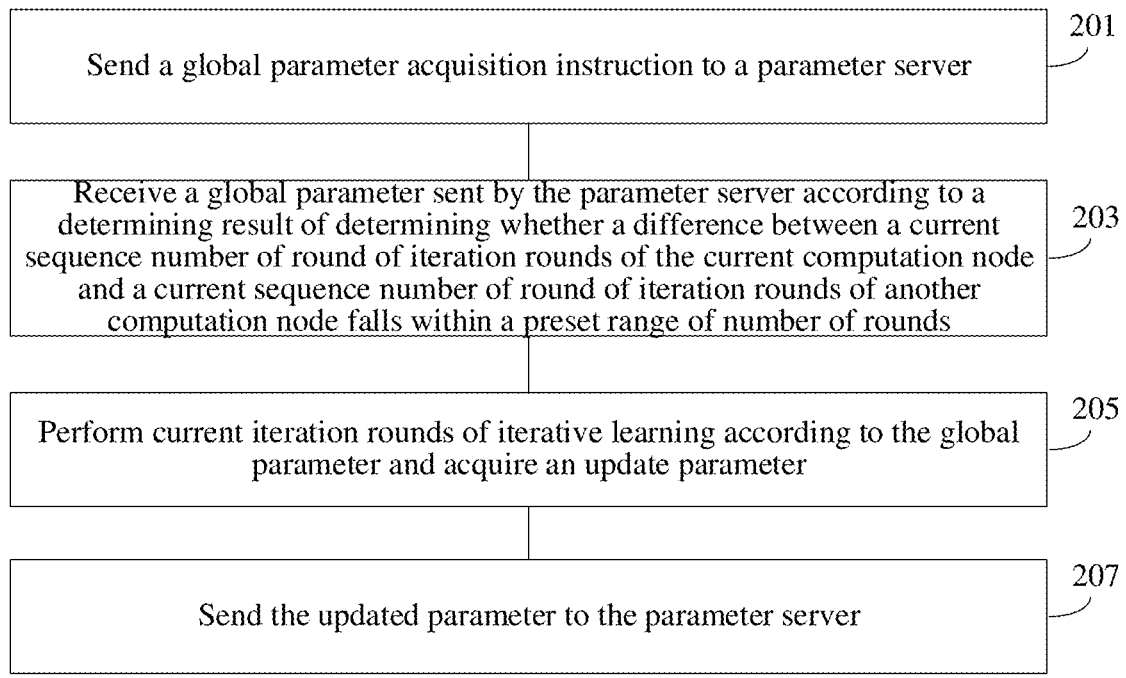
FIG. 8 is a logic flow of a distributed machine learning method.

FIG. 8 shows a distributed machine learning method according to another embodiment of this disclosure. The method may be applied to the computation node shown in FIG. 1, and specifically includes the following steps:

Step 201: Send a global parameter acquisition instruction to a parameter server.

The parameter server provides a Pull interface for the computation node, and the computation node sends the global parameter acquisition instruction to the parameter server through the Pull interface before starting the current rounds of iterative learning, so as to acquire a latest global parameter.

Step 203: Receive a global parameter sent by the parameter server according to a determining result of determining whether a difference between a current sequence number of iteration rounds of the current computation node and a current sequence number of iteration rounds of another computation node falls within the preset range of number of rounds.

The parameter server determines whether an iteration progression speed of the computation node satisfies requirements according to the current sequence number of iteration rounds of the computation node, and send a latest global parameter to the computation node if determining the iteration progression speed satisfies the requirements, so as to control a difference of iteration progression speeds of different computation nodes while implementing the distributed machine learning method based on an asynchronous parallel protocol, thereby realizing distributed machine learning based on a finite asynchronous parallel protocol. Therefore, the speeds of the computation nodes are allowed to have a certain difference, and a fast computation node may not wait for a slow computation node, so that the whole system does not need to wait for the slowest computation node, thereby reducing waiting time. In this embodiment, the parameter server determines whether a difference between the current sequence number of iteration rounds of the current computation node and the current sequence number of iteration rounds of another computation node falls within the preset range of number of rounds, so as to determine the iteration progression speed of the current rounds of iterations satisfies requirements. The latest global parameter refers to an updated global parameter acquired after the parameter server updates the global parameter in real time according to the update generated by each round of iterative learning of the computation node. In another embodiment, according to the global parameter acquisition instruction of the current computation node in the current rounds, the parameter server sends the global parameter copy of the fastest computation node among all the computation nodes to the current computation node as a latest global parameter when determining the difference range of iteration progression speeds is satisfied, and usually, the global parameter copy of the fastest computation node and the global parameter that is updated cooperatively in real time have a minimum difference. Therefore, the global parameter copy of the fastest computation node serves as a latest global parameter, so as to enhance training accuracy.

Step 205: Perform current iteration round of iterative learning according to the global parameter and acquiring an updated parameter.

The computation node receives the global parameter sent by the parameter server, and uses an allocated data subset to perform a parallel SGD algorithm to iteratively learn a training machine learning model to acquire an updated parameter.

Step 207: Send the updated parameter to the parameter server.

After finishing the current rounds of iterative learning, the computation node invokes the Push interface of the parameter server to send the updated parameter to the parameter server, so that the parameter server updates the global parameter.

For the distributed machine learning method, each computation node uses an allocated training data subset to perform a parallel SGD algorithm to iteratively learn a training machine learning model, and uses a parallel acceleration algorithm to perform model training, so as to avoid a single-point bottleneck, and ensure processing of a TB or higher level of data quantity. Before starting each round of iteration, the computation node acquires a latest global parameter from the parameter server, and starts the current round of iterative learning only after receiving the global parameter sent by the parameter server when determining that the iteration progression speed of the current computation node falls within the preset range of number of rounds, so that the speed difference between different computation nodes is limited to a preset range, thereby forming distributed machine learning based on a finite asynchronous parallel protocol and reducing disturbance influence of the update generated by different computation nodes on the global parameter.

Figure 9:
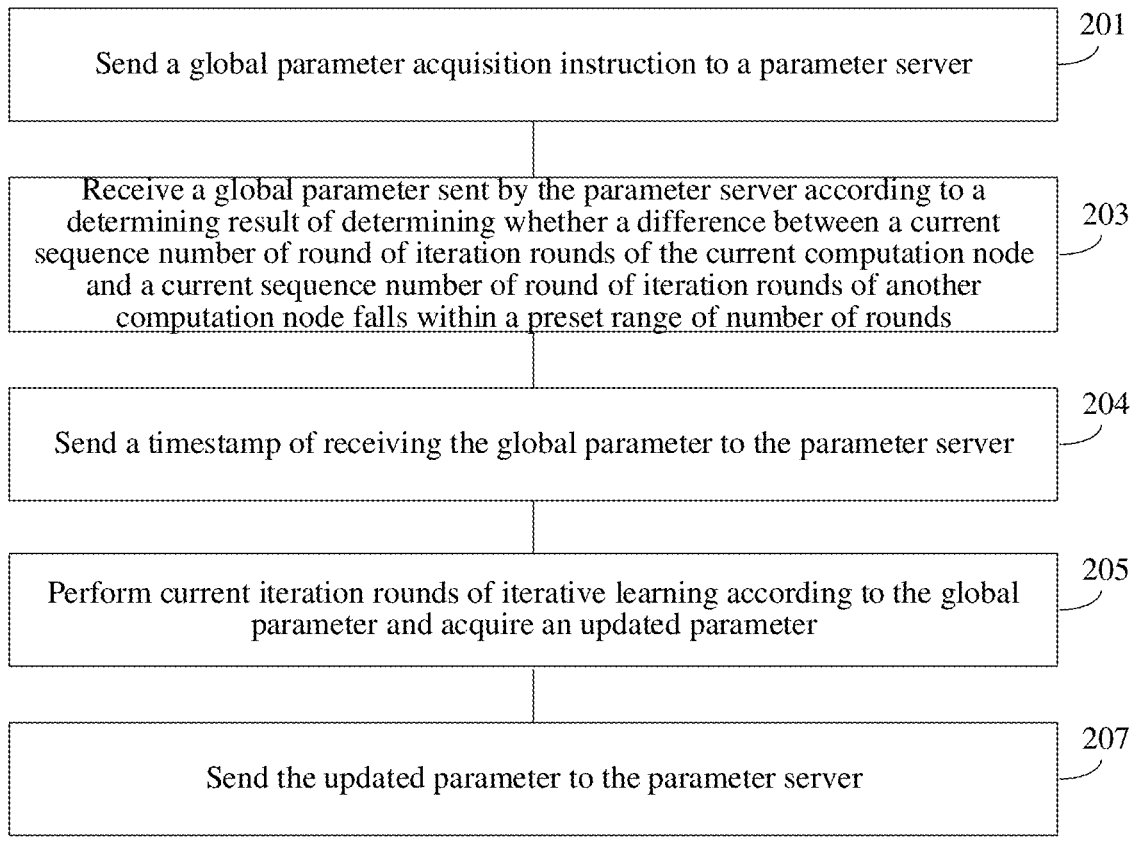
FIG. 9 is a logic flow of a distributed machine learning method.

In an embodiment, referring to FIG. 9, after step 203, that is, receive a global parameter sent by the parameter server according to a determining result of determining whether a difference between a current sequence number of iteration rounds of the current computation node and a current sequence number of iteration rounds of another computation node falls within the preset range of number of rounds, the method further includes:

Step 204: Send a timestamp of receiving the global parameter to the parameter server.

The computation node sends the timestamp of receiving the global parameter to the parameter server, the parameter server stores the timestamp of receiving the global parameter by the computation node as starting time of a delay time corresponding to the updated parameter generated by computing the current iterative learning of the current computation node, so as to support the parameter server to acquire the timestamp of receiving the global parameter by the computation node and the delay parameter corresponding to the computation node when computing the updated parameter of each round of iterative learning, imposes a corresponding degree of penalty on an update corresponding to an iteration round with a larger delay, so as to prevent the update generated by the iteration round with a larger delay from disturbing the global parameter and control disturbance influence of the updates generated by different computation nodes on the global parameter. In an embodiment, the timestamp of receiving the global parameter by the computation node may be a global parameter timestamp maintained by the parameter server, and the global parameter timestamp may be the global parameter timestamp determined by the parameter server according to a number of times of receiving the updated parameter.

In a specific embodiment, for example, the $m^{th}$ computation node starts the $c^{th}$ round of iteration, and before starting the $c^{th}$ round of iteration, the computation node sends a global parameter acquisition instruction to the parameter server, the computation node m receives a latest global parameter sent by the parameter server after the current sequence number of iteration rounds falls within the preset range of number of rounds and performs iterative learning, so as to acquire the updated parameter, and returns the updated parameter to the parameter server, and the specific implementation method is exemplarily represented as follows:

```
for c = 0 to C:
    θm = pull (m , c) //before starting the cth round of iteration, acquire a latest gloal parameter from the parameter server
    um = 0 //initialize a local parameter and update it as 0
    um = SGD(N, θm) //use SGD training data to acquire an updated parameter
    push(m, c, um) //invoke a Push interface of the parameter server, and send a local update
```

$θ_m$ refers to a global parameter copy stored on the computation node, C refers to a maximum sequence number of iteration rounds, and um refers to a local updated parameter of the computation node m. Before starting the cth round of iteration, the computation node invokes the Pull interface of the parameter server to acquire a latest global parameter, and initializes the local updated parameter as 0. The computation node acquires a latest global parameter sent by the parameter server and uses the parallel SGD algorithm to traverse an allocated data subset to iteratively learn a training machine learning model to acquire the updated parameter, and then, invokes the Push interface of the parameter server to send the updated parameter to the parameter server, so as to support the parameter server to update the global parameter in real time according to the updated parameter.

Figure 10:
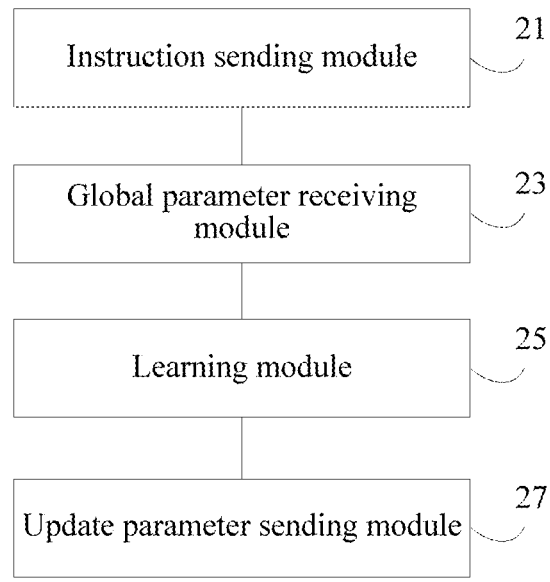
FIG. 10 is a schematic diagram of a distributed machine learning system.

In an embodiment, referring to FIG. 10, a distributed machine learning system includes an instruction sending module 21, a global parameter receiving module 23, a learning module 25, and an updated parameter sending module 27. The instruction sending module 21 is configured to send a global parameter acquisition instruction to a parameter server. The global parameter receiving module 23 is configured to receive a global parameter sent by the parameter server according to a determining result of determining whether a difference between a current sequence number of iteration rounds of the computation node and a current sequence number of iteration rounds of another computation node falls within the preset range of number of rounds. The learning module 25 is configured to perform current iteration round of iterative learning according to the global parameter and acquire an updated parameter. The updated parameter sending module 27 is configured to send the updated parameter to the parameter server.

Figure 11:
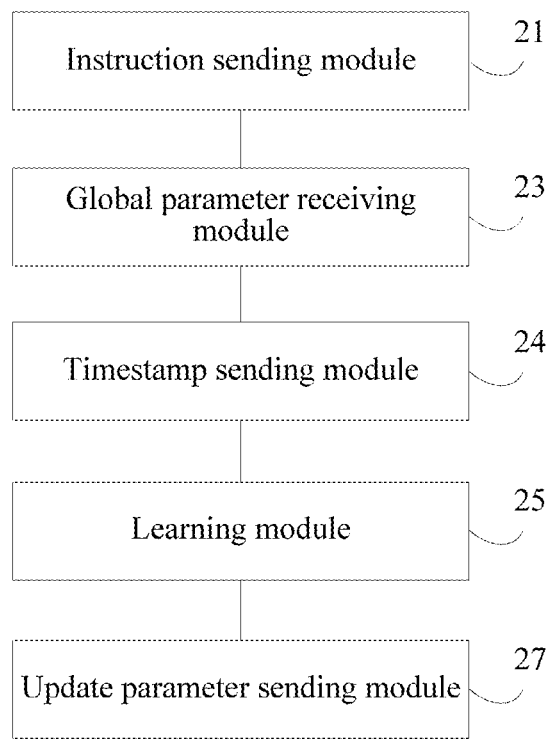
FIG. 11 is a schematic diagram of a distributed machine learning system.

In an embodiment, referring to FIG. 11, the distributed machine learning system further includes a timestamp sending module 24. The timestamp sending module 24 is configured to send the timestamp of receiving the global parameter by the global parameter receiving module 23 to the parameter server after the global parameter receiving module 23 receives a global parameter sent by the parameter server according to a determining result of determining whether a different between current sequence number of iteration rounds of the current computation node and the current sequence number of iteration rounds of another computation node falls within the preset range of number of rounds.

A person of ordinary skill in the art may understand that all or some of the flows of the methods in the foregoing embodiments may be implemented by a computer program instructing relevant hardware. As such, the computer program constitutes part of this disclosure. In addition, the computer program may be stored in a computer readable storage medium and may be executed by directly reading the program from the storage medium or by installing or copying the computer program to a non-transitory storage device (such as a hard disk or memory) of a data processing device. When the computer program is being executed, the flow in the embodiment of each of the foregoing methods may be implemented. Therefore, such a non-transitory storage medium also constitutes part of this disclosure. The storage medium may be a magnetic disk, an optical disc, a Read-Only Memory (ROM), a Random Access Memory (RAM), or the like.

The foregoing embodiments only describe several exemplary implementations of this disclosure in detail. which cannot therefore be understood as a limitation to the patent scope of the present disclosure. It should be noted that a person of ordinary skill in the art may further implement variations and improvements without departing from the conception of this disclosure, and these variation and improvements all fall within the protection scope of this disclosure.

What is claimed is:

1. A method for distributed machine learning and model training using a parameter server comprising a processor and a memory in communication with a plurality of computation nodes comprising processors and memories, wherein each of the plurality of computation nodes is used to perform iterative rounds of training of a model, the method comprising:

receiving, by the parameter server, a global parameter acquisition instruction from a first computation node;

determining, by the parameter server, whether a difference between a sequence number of a current iteration round of the first computation node and a sequence number of a current iteration round of a second computation node falls within a preset range of number of rounds;

sending, by the parameter server, a global parameter to the first computation node when it is determined that the difference falls within the preset range of number of rounds;

receiving, by the parameter server, an updated parameter sent by the first computation node after the first computation node performs the current iteration round of the first computation node using the global parameter sent by the parameter server;

computing, by the parameter server, a computation delay parameter according to a timestamp for receiving the updated parameter by the parameter server and a timestamp for receiving the global parameter by the first computation node, wherein the computation delay parameter represents a time delay due to computation of the updated parameter in the current iteration round of the first computation node;

updating, by the parameter server, the global parameter according to the computation delay parameter and the updated parameter from the first computation node, wherein the computation delay parameter is used to obtain a weight for adjusting the updated parameter to obtain an updated global parameter; and storing, by the parameter server, the updated global parameter for next iterative rounds of training.

2. The method according to claim 1, wherein the second computation node comprises a computation node among the plurality of computation nodes having a minimum sequence number of current round of iteration.

3. The method according to claim 1, wherein the second computation node comprises a computation node among the plurality of computation nodes having a maximum sequence number of current round of iteration.

4. The method according to claim 1, wherein after sending, by the parameter server, the global parameter to the first computation node, the method further comprises:

acquiring, by the parameter server, the timestamp for receiving the global parameter by the first computation node.

5. The method according to claim 1, wherein computing the computation delay parameter according to the timestamp for receiving the updated parameter by the parameter server and the timestamp for receiving the global parameter by the first computation node, updating the global parameter according to the computation delay parameter and the updated parameter from the first computation node to obtain the updated global parameter, and storing the updated global parameter comprises:

acquiring, by the parameter server, the timestamp for receiving the updated parameter as a current timestamp for the global parameter, and computing a delay between the current timestamp for the global parameter and the timestamp for receiving the global parameter by the first computation node as the computation delay parameter;

updating, by the parameter server, the global parameter according to a ratio of the updated parameter to the computation delay parameter to obtain the updated global parameter; and storing, by the parameter server, the updated global parameter for the next iterative rounds of training.

6. A non-transitory computer readable storage medium, storing a computer program, the computer program being executed by a processor to implement the method for distributed machine learning and model training according to claim 1.

7. A system for distributed machine learning model training in communication with a plurality of computation nodes, comprising: a processor and a memory in communication to the processor, the memory storing instructions, wherein the processor, when executing the instructions, is configured to:
receive a global parameter acquisition instruction from a first computation node;
determine whether a difference between a sequence number of a current iteration round of the first computation node and a number of a current iteration round of a second computation node falls within a preset range of number of rounds;
send a global parameter to the first computation node when the difference falls within the preset range of number of rounds;
receive an updated parameter sent by the first computation node after the first computation node performs the current iteration round of the first computation node using the global parameter sent by the system;
compute a computation delay parameter according to a timestamp for receiving the updated parameter by the system and a timestamp for receiving the global parameter by the first computation node, wherein the computation delay parameter represents a time delay due to computation of the updated parameter in the current iteration round of the first computation node;
update the global parameter according to the computation delay parameter and the updated parameter from the first computation node, wherein the computation delay parameter is used to obtain a weight for adjusting the updated parameter to obtain an updated global parameter; and
store the updated global parameter for next iteration rounds of training.

8. The system according to claim 7, wherein the second computation node comprises a computation node among the plurality of computation nodes having a minimum sequence number of current round of iteration.

9. The system according to claim 7, wherein the second computation node comprises a computation node among the plurality of computation nodes having a maximum sequence number of current round of iteration.

10. The system according to claim 7, wherein the processor, when executing the instructions, is further configured to acquire the timestamp for receiving the global parameter by the first computation node after sending the global parameter to the first computation node.

11. The system according to claim 7, wherein the processor, when executing the instructions, is further configured to:
receive the updated parameter sent by the first computation node after performing the current iteration round using the global parameter;
acquire the timestamp for receiving the updated parameter as a current timestamp for the global parameter, and compute a delay between the current timestamp for the global parameter and the timestamp for receiving the global parameter by the first computation node as the computation delay parameter;
update the global parameter according to a ratio of the updated parameter to the computation delay parameter to obtain the updated global parameter; and
store the updated global parameter for the next iterative rounds of training.

12. A method for distributed machine learning and model training using a first computation node among a plurality of computation nodes and having a processor and memory and in communication with a parameter server comprising a processor and memory, wherein each of the plurality of computation nodes is used to perform iterative rounds of training of a model, the method comprising:
sending, by the first computation node, a global parameter acquisition instruction to the parameter server;
receiving, by the first computation node, a global parameter sent by the parameter server upon determining by the parameter server that a difference between a sequence number of a current iteration round of the first computation node and a sequence number of a current iteration round of a second computation node falls within a preset range of number of rounds;
performing, by the first computation node, the current iteration round of the first computation node using the global parameter sent by the parameter server;
obtaining, by the first computation node, an updated parameter after the current iteration round of the first computation node;
sending, by the first computation node, the updated parameter to the parameter server; and
sending, by the first computation node, a timestamp for receiving the global parameter to the parameter server to cause the parameter server to compute a computation delay parameter of the first computation node, wherein the computation delay parameter represents a time delay due to computation of the updated parameter in the current iteration round of the first computation node.

13. A non-transitory computer readable storage medium, storing a computer program, the computer program being executed by a processor to implement the method for distributed machine learning and model training according to claim 12.

14. A first computation node for distributed machine learning and model training among a plurality of computation nodes and in communication with a parameter server, comprising a processor and a memory in communication with the processor, the memory storing instructions, wherein the processor, when executing the instructions, is configured to:
send a global parameter acquisition instruction to the parameter server;
receive a global parameter sent by the parameter server upon determining by the parameter server that a difference between a sequence number of a current iteration round of the first computation node and a sequence number of a current iteration round of a second computation node falls within a preset range of number of rounds;
perform the current iteration round of the first computation node using the global parameter sent by the parameter server;
obtain an updated parameter after the current iteration round of the first computation node; and
send the updated parameter to the parameter server; and
send, by the first computation node, a timestamp for receiving the global parameter to the parameter server to cause the parameter server to compute a computation delay parameter of the first computation node, wherein the computation delay parameter represents a time delay due to computation of the updated parameter in the current iteration round of the first computation node.

* * * * *